(12) United States Patent
Nakajima (10) Patent No.: US 7,096,191 B2
(45) Date of Patent: Aug. 22, 2006

(54) CASH PAYMENT SYSTEM USING VENDING MACHINE (75) Inventor: Kazuya Nakajima, Sawa-gun (JP)

(73) Assignee: Sanden Corp., Gunma (JP)

(*) Notice: Subject to any disclaimer, the term of this patent is extended or adjusted under 35 U.S.C. 154(b) by 818 days.

(21) Appl. No.: 10/152,065

(22) Filed: May 22, 2002

(65) Prior Publication Data
US 2002/0178123 A1 Nov. 28, 2002

(30) Foreign Application Priority Data
May 24, 2001 (JP) ............................. 2001-155614

(51) Int. Cl.
G06F 17/60 (2006.01)

(52) U.S. Cl. ................. 705/16; 705/1; 705/26

(58) Field of Classification Search .............. 705/1, 705/13, 16, 26
See application file for complete search history.

(56) References Cited

U.S. PATENT DOCUMENTS

| 4,247,759 A | * | 1/1981 | Yuris et al. | 235/381 |
| 5,715,314 A | * | 2/1998 | Payne et al. | 705/78 |
| 5,757,917 A | * | 5/1998 | Rose et al. | 705/79 |
| 5,915,022 A | * | 6/1999 | Robinson et al. | 705/75 |
| 5,923,406 A | * | 7/1999 | Brasington et al. | 355/40 |
| 5,991,749 A | * | 11/1999 | Morrill, Jr. | 705/44 |
| 6,434,403 B1 | * | 8/2002 | Ausems et al. | 455/556.2 |
| 6,584,309 B1 | * | 6/2003 | Whigham | 455/414.1 |
| 6,684,200 B1 | * | 1/2004 | Koga | 705/71 |

FOREIGN PATENT DOCUMENTS

| JP | 09259337 A | * 10/1997 |
| JP | 2001-338328 | 7/2001 |

* cited by examiner

Primary Examiner—Calvin L. Hewitt, II
(74) Attorney, Agent, or Firm—Banner & Witcoff, Ltd.

(57) ABSTRACT

A host computer transmits a user ID and a list of vending machine IDs to a portable communication terminal. When the user selects from the list a vending machine through which the user makes a payment, the user ID and the ID of the selected vending machine are transmitted from a portable communication terminal to the host computer. The host computer issues to the vending machine corresponding to the vending machine ID an instruction to enter a payment acceptable mode. When the user makes a payment at the vending machine, the amount of the payment is transmitted to the host computer.

6 Claims, 8 Drawing Sheets

| USER ID | MAIL ADDRESS |
|---------|--------------|
| X 0 1   | maru@xxx.jp  |
| X 0 2   | batu@yyy.jp  |

| VENDING MACHINE ID | LOCATION |
|--------------------|----------|
| Y A 1 | MINATO-KU, TOKYO |
| Y B 1 | ISESAKI CITY, GUMMA |

CASH PAYMENT SYSTEM USING VENDING MACHINE

This application claims the benefit of Japanese Patent Application No. 2001-155614, which was filed on May 24, 2001. The entire contents of this application are incorporated herein by reference.

BACKGROUND OF THE INVENTION

The present invention relates to a system for handling real money in electronic commerce.

Recently, the electronic commerce through a network such as the Internet, etc. has become more and more popular in conducting transactions of merchandise and services. In the electronic commerce, a payment method is very important. For example, assume that merchandise is to be sold on a Web page of the Internet. In this case, as a payment method, a buyer can notify a seller of his or her credit card number. However, in this method, even an encrypted credit card number can be tapped. Another method is to make a payment in a bank, etc. before and after a buyer buys merchandise, etc. However, in this method, it is necessary to make a payment each time a buyer buys merchandise. Since a buyer has to perform a burdensome payment process, this method is not convenient.

In the above situation, there has been suggested method of conducting a transaction using electronic money, which can be processed through a network. In this method, a payment can be made by transferring the electronic money between a buyer and a seller. Thus, it is not necessary to use any real money in each transaction. However, it is necessary to buy electronic money using real money before conducting a transaction. Therefore, the above mentioned problem cannot be completely solved.

An example of the method will be described below. For example, a user first buys at a real shop a card which can pay a predetermined amount. When the user buys merchandise, etc. through a network, the user can make a payment for the merchandise by notifying the seller of his or her identification number described on the card. After buying the merchandise, the amount equivalent to the merchandise, etc. is subtracted from the total amount of money which can be paid by using the identification number. Thus, in this method, the identification number practically functions as electronic money or an electronic wallet. The card is a media for assigning the identification number to the user. Thus, although the identification number is tapped, the damages of the user can be limited to the predetermined amount. However, this method is not convenient because the user has to buy a card at a shop in advance.

BRIEF SUMMARY OF THE INVENTION

The present invention aims at providing a cash payment system capable of easily receiving real money for use in electronic commerce.

To attain the purpose, the system according to the present invention performs the process of a payment from a user of a portable communication terminal using a vending machine connected to a host computer through a network, and the portable communication terminal connected to the host computer through the network. The portable communication terminal includes a transmitter for transmitting identification information of the user and identification information of the vending machine to the host computer. The host computer includes a transmitter for transmitting an instruction of a payment to the vending machine specified by the received identification information of the vending machine. The vending machine includes controller for entering a payment acceptable mode in response to the instruction from the host computer, and a transmitter for transmitting an amount of payment from the user to the host computer.

According to the present invention, when the user transmits his or her identification information and the identification information of the vending machine from the portable communication terminal to the host computer, the vending machine specified by the identification information enters the payment acceptable mode. When the user makes a payment through the vending machine, the payment information is transmitted from the vending machine to the host computer. Thus, in the electronic commerce in which the user identification information is used as electronic money or an electronic wallet, the user can make a payment using real money through the vending machine.

Other objects, configurations, and effects of the present invention will be clarified by the following detailed explanation.

DETAILED DESCRIPTION OF THE INVENTION

FIRST EMBODIMENT

Figure 1:
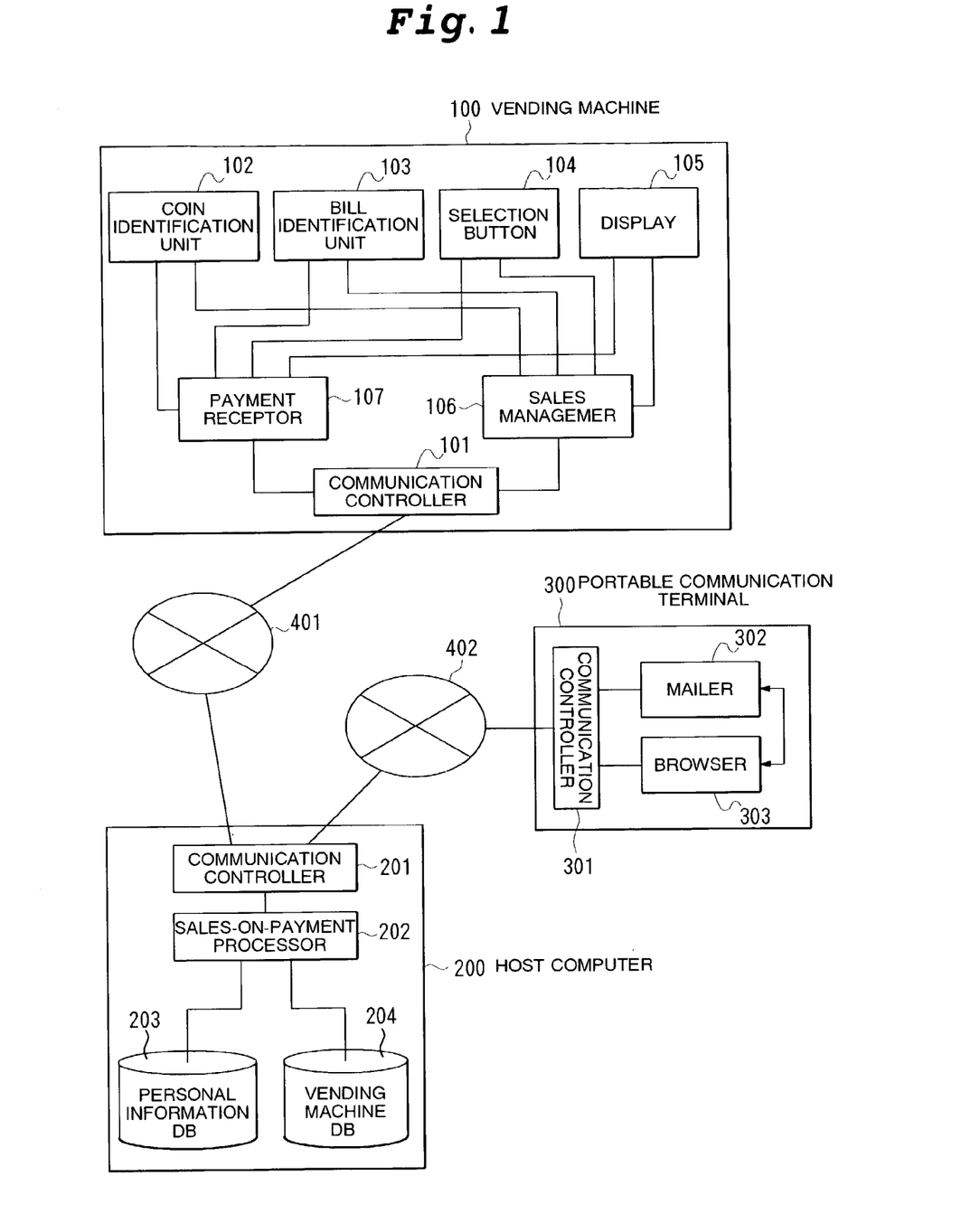
FIG. 1 shows a configuration of a sales-on-payment system according to a first embodiment of the present invention.
Figure 2:
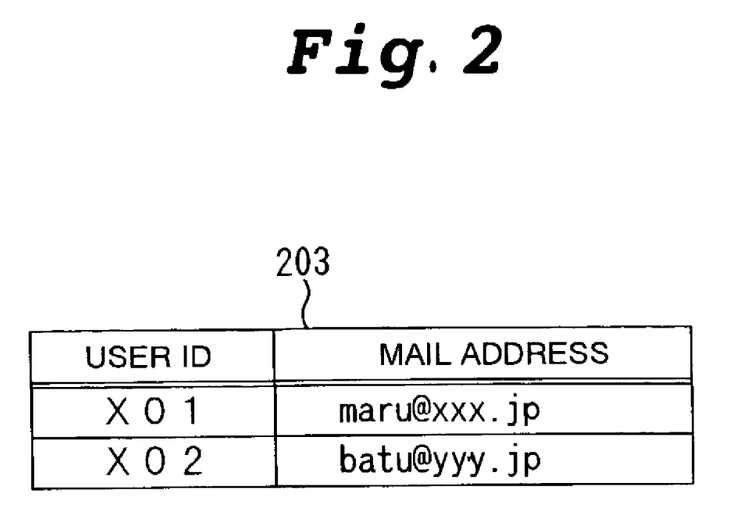
FIG. 2 shows a configuration of a personal information database.
Figure 3:
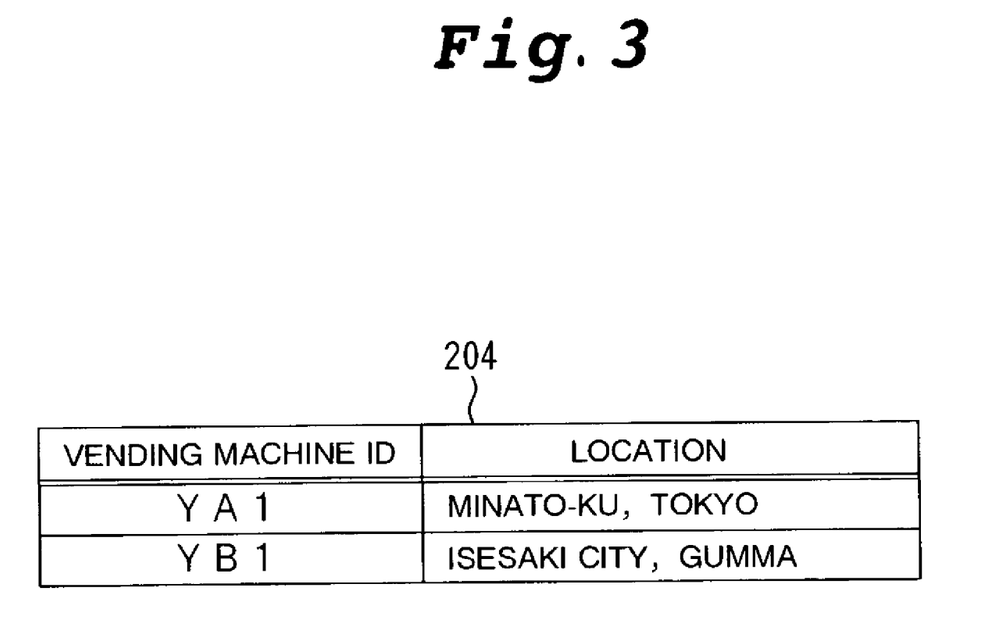
FIG. 3 shows a configuration of a vending machine database.

A first embodiment of the present invention will be described below by referring to the attached drawings. According to the present embodiment, a vending machine is used as a sales-on-payment system capable of not only paying cash, but also buying merchandise without any cash using the vending machine based on the previous payment process. FIG. 1 shows a configuration of the sales-on-payment system. FIG. 2 shows the configuration of the personal information database. FIG. 3 shows the configuration of the vending machine database.

As shown in FIG. 1, this sales-on-payment system comprises a vending machine 100 which can accept real money and stores merchandise, a host computer 200 for centrally managing each vending machine 100, and a network 401 for connecting each vending machine 100 to the host computer 200. The host computer 200 can communicate with a portable communication terminal 300 of a user through a network 402. The networks 401 and 402 can have any physical configurations, protocols, etc.

The vending machine 100 comprises a communication controller 101 which is an interface with the network 401, a coin identification unit 102 for identifying a received coin, a bill identification unit 103 for identifying a received bill, a selection button 104 for selecting merchandise on sale, a display 105 for displaying a received amount, a sales manager 106 for managing sales of merchandise, and a payment receptor 107 for performing a payment reception process. The vending machine 100 comprises a cooling device and a heating device for controlling the temperature of merchandise, merchandise dispensing device, etc. (not shown in the attached drawings).

Normally when the coin identification unit 102 and the bill identification unit 103 identify the reception of money exceeding a predetermined amount, the sales manager 106 blinks the lamp (not shown in the attached drawings) provided for the selection button 104, and enters a merchandise selectable mode. When the user presses the selection button 104, the merchandise specified by selection button 104 is dispensed. On the other hand, the sales manager 106 manages the types, the number, etc. of pieces of sold merchandise. The management data is transmitted to the host computer 200 periodically or as necessary. The operations of the sales manager 106 of the vending machine 100 are the same as the operations in the conventional system, the detailed explanation is omitted here.

At an instruction from the host computer 200, the sales manager 106 dispenses merchandise without a user slotting money. Practically, at an instruction of the host computer 200, the sales manager 106 blinks the lamp (not shown in the attached drawings) provided for the selection button 104, and enters the merchandise selectable mode. When the user presses the selection button 104, the merchandise specified by the selection button 104 is dispensed.

At an instruction from the host computer 200, the payment receptor 107 accepts a payment from the user, and transmits the amount to the host computer 200. Practically, when the payment receptor 107 receives the payment number identifying the payment process from the host computer 200, it displays the payment number on the display 105. When the user slots a predetermined amount of money into the coin identification unit 102 or the bill identification unit 103, the payment receptor 107 blinks the lamp (not shown in the attached drawings) provided for the selection button 104 for payment. When the selection button 104 is pressed, the amount of payment is transmitted to the host computer 200.

The host computer 200 comprises a communication controller 201 which is an interface with the network 401, a sales-on-payment processor 202, a personal information database (hereinafter referred to as a personal information DB) 203, and a vending machine database (hereinafter referred to as a vending machine DB) 204. The sales-on-payment processor 202 processes a payment request from the portable communication terminal 300 of the user, and instructs the vending machine 100 to receive the payment. The sales-on-payment processor 202 instructs the vending machine 100 to dispense the merchandise using the balance of the already paid amount. Since the portable communication terminal 300 is provided with a mailer and a browser as described later, the sales-on-payment processor 202 is configured such that various data can be transmitted and received using the applications.

As shown in FIG. 2, the personal information DB 203 stores payment information of each user. The payment information stored in the personal information DB 203 at least includes a user ID as identification information of the user and a mail address.

As shown in FIG. 3, the vending machine DB 204 stores the information about a vending machine. The information stored in the vending machine DB 204 includes the vending machine ID as identification information of the vending machine 100, the location, etc.

The portable communication terminal 300 can communicate with the host computer 200 through the network 402. The type of communications protocol between them is not specified. According to the present embodiment, the portable communication terminal 300 comprises a communication controller 301, a mailer (mail client software) 302, and a browser (http client software) 303, and establishes communication of various data with the host computer 200 using the software. In addition, in the portable communication terminal 300 according to the present embodiment, the mailer 302 and the browser 303 cooperate with each other. Practically, if a mail address is embedded as a link in the Web page displayed by the browser 303, the mailer 302 can be activated when the link is selected. On the other hand, if the link to the Web page is contained in the message displayed by the mailer 302, the browser 303 is activated when the link is selected, thereby displaying the linked-to Web page.

Figure 4:
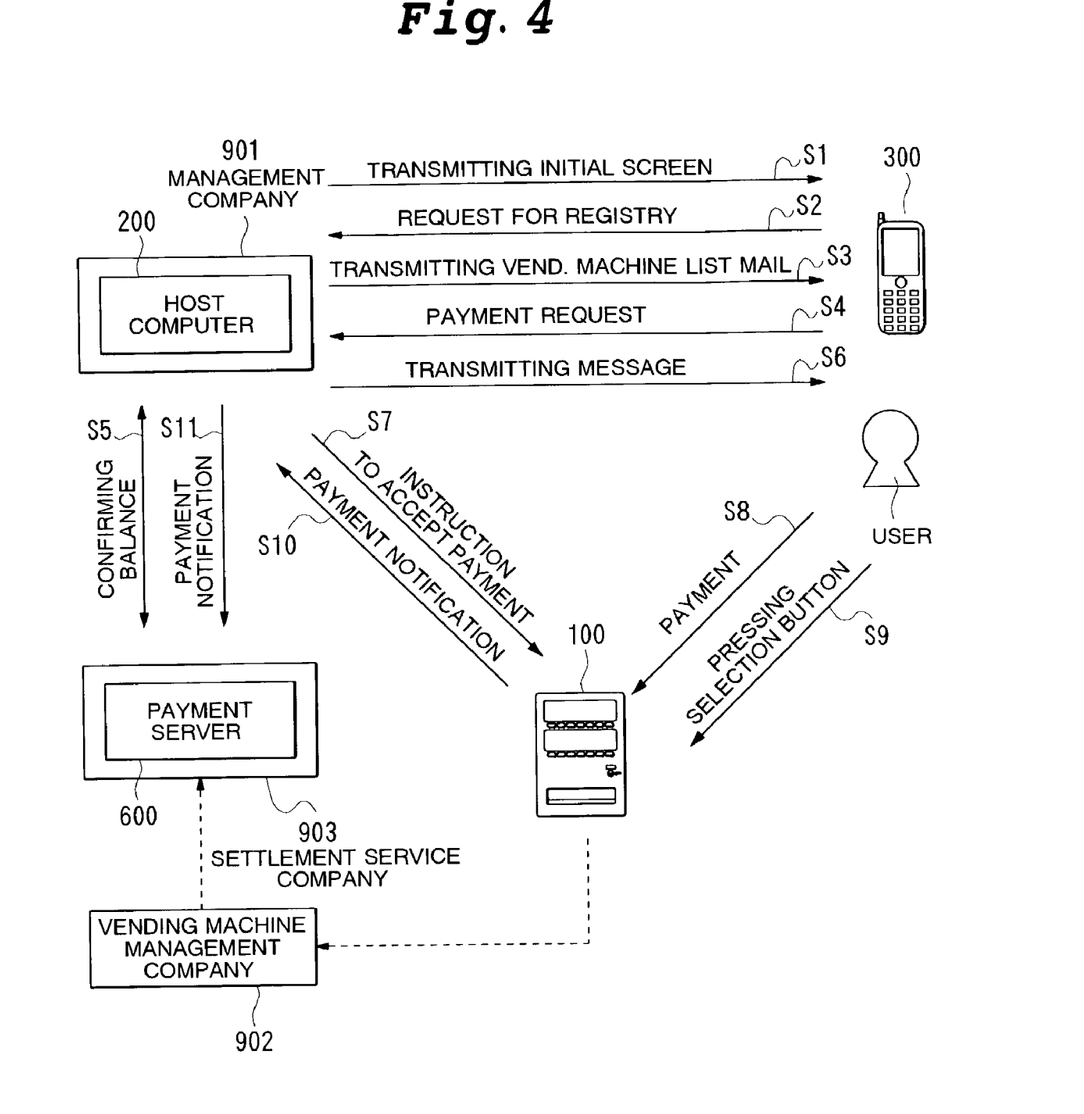
FIG. 4 shows a flow of a user registry and a payment process in the sales-on-payment system according to the first embodiment of the present invention.
Figure 5:
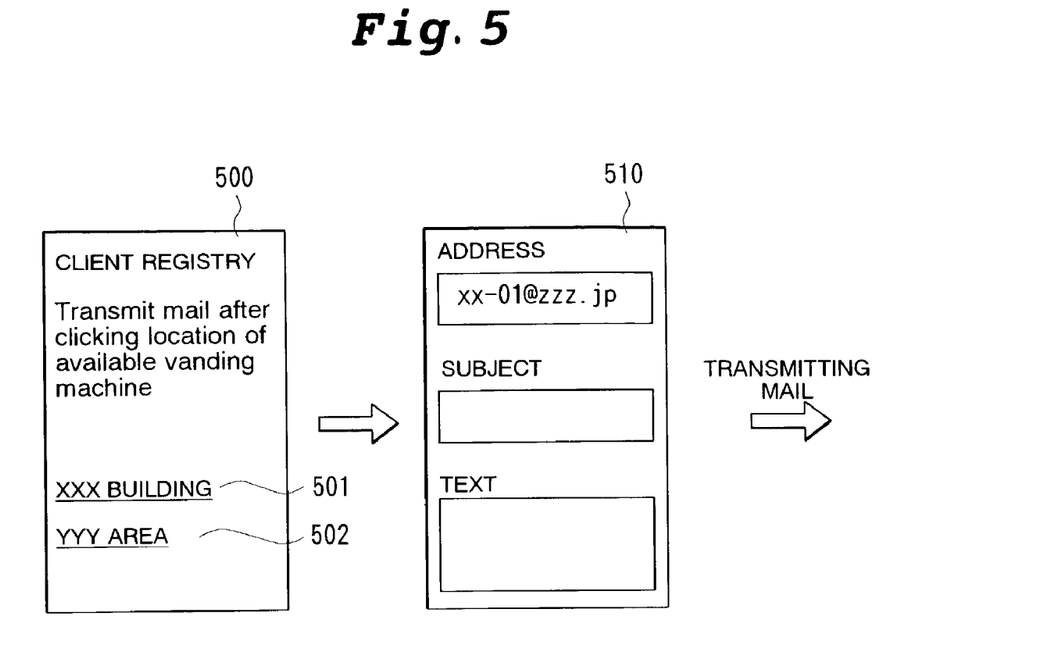
FIG. 5 shows an example of a screen of a portable communication terminal when a user is registered.
Figure 6:
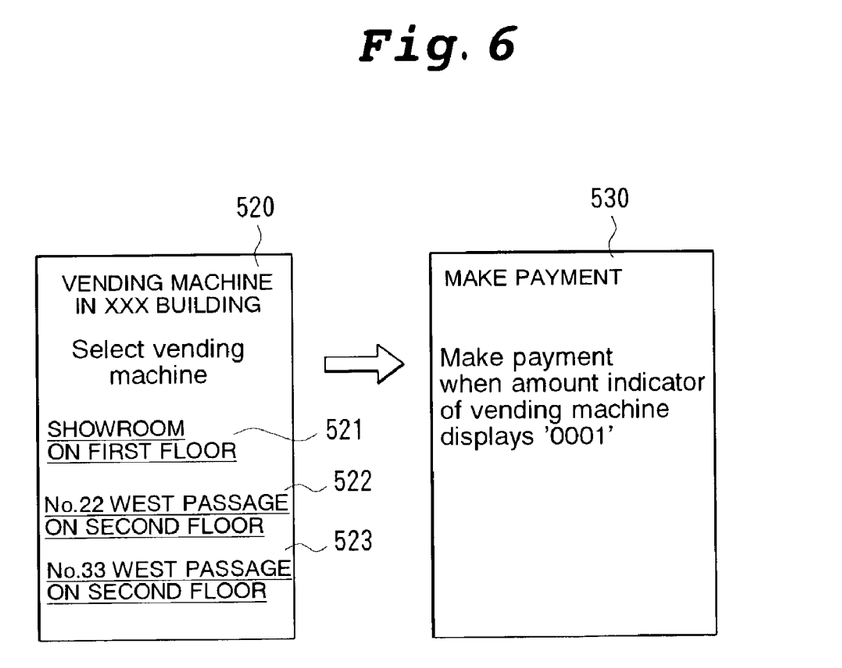
FIG. 6 shows an example of the screen of the portable communication terminal when a payment process is performed.
Figure 7:
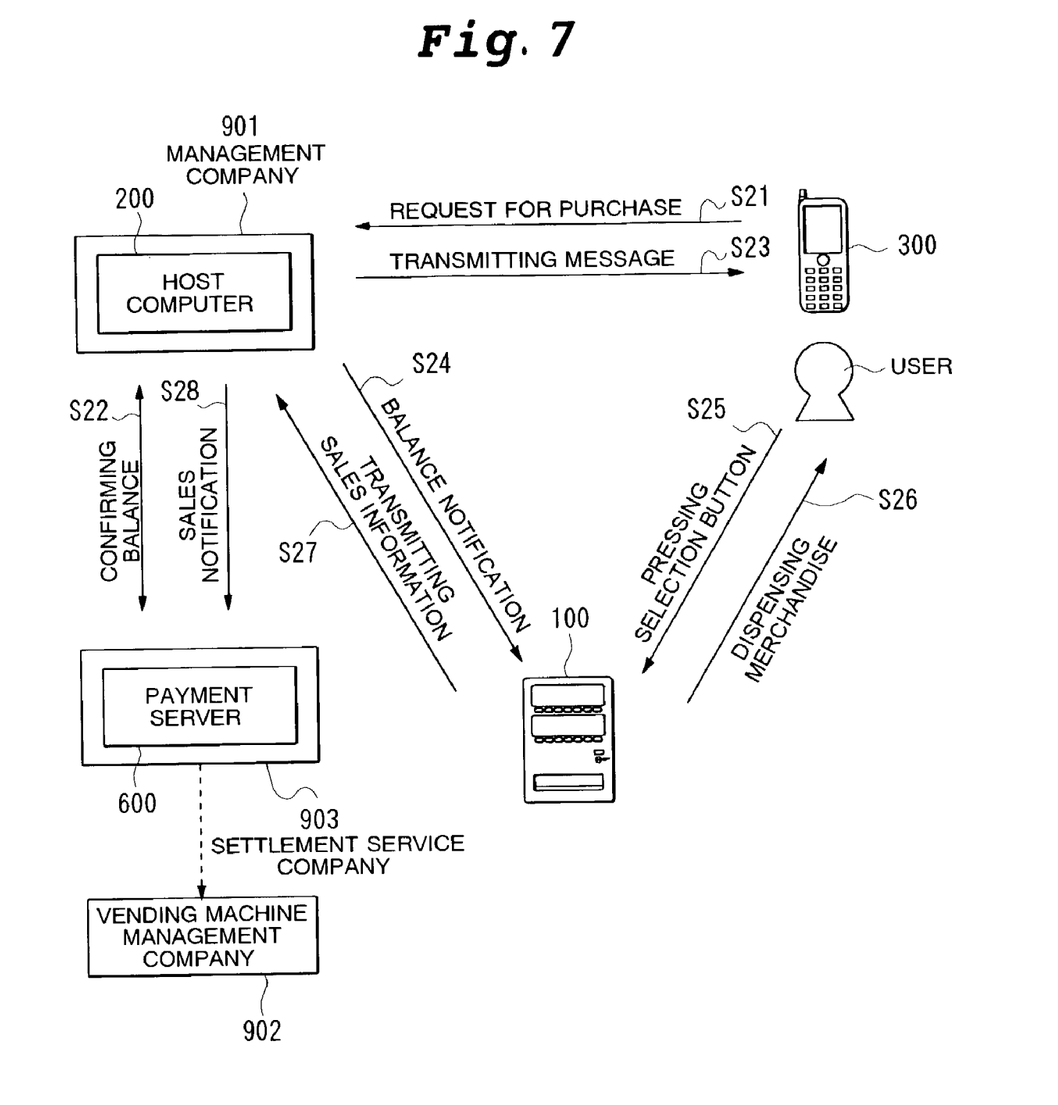
FIG. 7 shows the flow of selling merchandise in the sales-on-payment system according to the first embodiment of the present invention.
Figure 8:
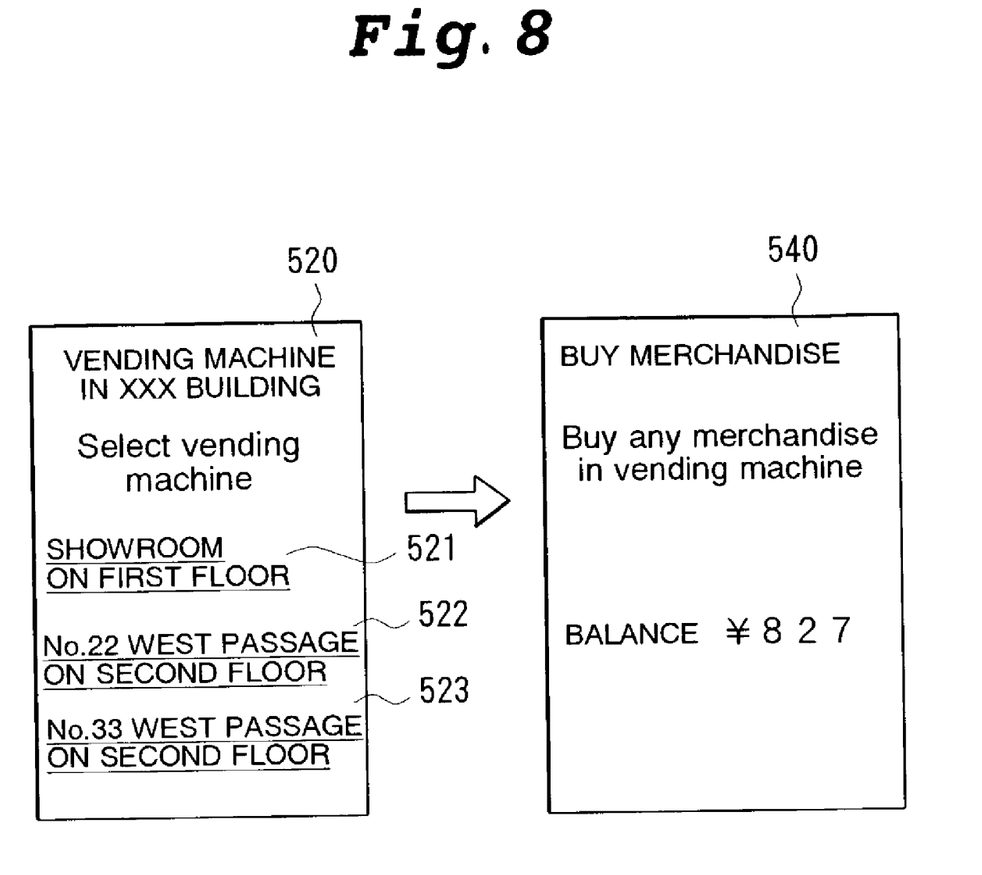
FIG. 8 shows an example of the screen of the portable communication terminal when merchandise is sold.

The operations of the sales-on-payment system according to the present embodiment will be described below by referring to FIGS. 4 to 8. FIG. 4 shows the flow of the user registry and the payment process in the sales-on-payment system. FIG. 5 shows an example of the screen of the portable communication terminal when a user is registered. FIG. 6 shows an example of the screen of the portable communication terminal when a payment process is performed. FIG. 7 shows the flow of selling merchandise in the sales-on-payment system. FIG. 8 shows an example of the screen of the portable communication terminal when merchandise is sold.

In this example, it is assumed that a management company 901 manages the host computer 200, and a vending machine management company 902 manages the supplement of merchandise and the collection of cash for the vending machine 100. A settlement service company 903 manages the user ID issued by the host computer 200 and the balance corresponding to the user ID.

Described first is the flow of the user registry. By the user registry, a user ID is issued to a user. The user ID is managed by the server of the settlement service company 903, and is available in the electronic commerce through the Internet. In the electronic commerce, the user makes a payment using the user ID in a payment server 600 of the settlement service company 903.

When the user accesses the host computer 200 by using the browser 303 of the portable communication terminal 300, a Web page 500 as shown in FIG. 5 is displayed on the screen of the portable communication terminal 300 (step S1 shown in FIG. 4). On the Web page 500, links 501 and 502 provided for each payment area are set as shown in FIG. 5. The respective mail addresses are set for the links 501 and 502. The sales-on-payment processor 202 of the host computer 200 processes the mail transmitted according to each mail address. When the user selects the link 501 or 502, the browser 303 turns the mailer 302 active on a new mail generation mode. As shown in FIG. 5, the mail address set for the link 501 or 502 is specified as the address of a new mail 510. By transmitting the mail 510, the portable communication terminal 300 issues a registry request of the user ID to the host computer 200 (step S2 shown in FIG. 4). At this time, the title and the text of the transmitted mail 510 are not required.

Upon receipt of the mail 510 of a registry request, the sales-on-payment processor 202 of the host computer 200 generates a user ID corresponding to the received mail 510, and stores the source mail address of the mail 510 together with the user ID in the personal information DB 203. Then, the sales-on-payment processor 202 transmits mail 520 including a list of the vending machines 100 to the source mail address of the received mail 510 (step S3 shown in FIG. 4). FIG. 6 shows the mail 520 displayed on the portable communication terminal 300. Lists 521 to 523 of the vending machines 100 included in the mail 520 list the vending machines 100 installed in the areas selected by the mail addresses transmitted in step S2. The respective links are set for the lists 521 through 523 of the vending machines 100 of the mail 520. The user ID and the vending machine ID are set for each link as the parameters to the host computer 200 together with the addresses of the host computer 200. Thus, the user registry is completed in the steps above.

Described below will be the payment process performed by the user using the vending machine 100. First, the portable communication terminal 300 displays the mail 520 transmitted by the host computer 200. When the user selects the link of the vending machine 100 receiving a payment according to the mail 520 displayed on the portable communication terminal 300, the browser 303 is activated to access the host computer 200 at the linked-to address, and the user ID and the vending machine ID of the selected vending machine 100 are transmitted to the host computer 200 (step S4 shown in FIG. 4).

When the portable communication terminal 300 accesses the sales-on-payment processor 202 of the host computer 200, the processor accesses the payment server 600 of the settlement service company 903, and checks whether or not there is a positive balance relating to the received user ID (step S5 shown in FIG. 4). If there is no positive balance (including the case in which there is no entry of the user ID in the payment server 600 of the settlement service company 903), then an identification number of a payment process is generated to perform the payment process. Then, a Web page 530 including the identification number and prompting the user to make a payment is transmitted to the portable communication terminal 300 (step S6 shown in FIG. 4). FIG. 6 shows the Web page 530 displayed on the portable communication terminal 300. In FIG. 6, '0001' shows the identification number of a payment process. The sales-on-payment processor 202 issues an instruction to enter a payment acceptable mode to the vending machine 100 specified by the vending machine ID received from the portable communication terminal 300 (step S7 shown in FIG. 4). The instruction includes the identification number of the payment process.

Upon receipt of the instruction from the host computer 200, the payment receptor 107 of the vending machine 100 displays the identification number included in the received instruction on the display 105. When the user confirms that the identification number displayed on the portable communication terminal 300 matches the identification number displayed on the display 105 of the vending machine 100, the user can avoid mistakenly making a payment for another user ID. When coins or bills of a predetermined amount are slotted into the vending machine 100 after the user has confirmed the identification number (step S8 shown in FIG. 4), the lamp provided for the selection button 104 for payment is blinked. When the user presses the selection button 104 (step S9 shown in FIG. 4), vending machine 100 notifies the host computer 200 of the payment (step S10 shown in FIG. 4).

Upon receipt of the payment notification from the vending machine 100, the host computer 200 notifies the payment server 600 of the settlement service company 903 of the user ID and the payment, and adds the payment to the current balance relating to the user ID in the payment server 600 of the settlement service company 903 (S11 shown in FIG. 4).

By performing the processes in the steps above, the payment process relating to the issued user ID is completed. The money stored in the vending machine 100 is collected by the vending machine management company 902, and the amount obtained by subtracting a predetermined commission is transmitted to the settlement service company 903 (cf. the arrow represented by the dotted lines shown in FIG. 4).

Next, the case in which the user buys merchandise through the vending machine 100 by using the user ID will be described below by referring to FIGS. 7 and 8. First, the user displays the mail 520 including a list of vending machines received at the user registry on the portable communication terminal 300, and selects the desired vending machine (cf. step S21 shown in FIG. 7 and FIG. 8). Thus, the user ID and the vending machine ID are transmitted from the portable communication terminal 300 to the host computer 200.

When the portable communication terminal 300 accesses the sales-on-payment processor 202 of the host computer 200, the sales-on-payment processor 202 accesses the payment server 600 of the settlement service company 903, and checks whether or not there is a positive balance relating to the received user ID (step S22 shown in FIG. 7). The steps described above are the same as the steps in the payment process described above.

Since there is a positive balance in this example, the sales-on-payment processor 202 transmits a web page 540 including the amount of the balance and prompting the user to buy the merchandise to the portable communication terminal 300 (cf. step S23 shown in FIG. 7 and FIG. 8). On the other hand, the sales-on-payment processor 202 notifies the vending machine 100 specified by the vending machine ID received from the portable communication terminal 300 of the amount of the balance (step S24 shown in FIG. 7).

Upon receipt of the amount of the balance from the host computer 200, the sales manager 106 of the vending machine 100 blinks the lamp provided for the selection button 104 corresponding to the merchandise which can be purchased using the balance. When the user presses any one of the selection buttons 104 (step S25 shown in FIG. 7), the merchandise corresponding to the button is dispensed (step S26 shown in FIG. 7). The sales manager 106 transmits the sales information including the sales amount and the sales volume to the host computer 200 after the merchandise is dispensed (step S27 shown in FIG. 7).

Upon receipt of the sales information from the vending machine 100, the sales-on-payment processor 202 of the host computer 200 accesses the payment server 600 of the settlement service company 903, and subtracts the sales amount from the current balance (S28 shown in FIG. 7).

In the steps above, the user can buy the merchandise through the vending machine 100 not using cash, but using the user ID obtained by the previous payment process. The payment for the sold merchandise is made from the settlement service company 903 to the vending machine management company 902 (cf. the arrow represented by dotted lines shown in FIG. 7).

As described above in detail, according to the present embodiment, the user obtains the user ID from the host computer 200 using the portable communication terminal 300, and slots real money into the vending machine 100, thereby performing a payment process corresponding to the user ID. Since the vending machine has already been provided with a system of handling real money, the user can easily and successfully make a payment using real money through the vending machine 100. Furthermore, according to the present embodiment, since the user can buy merchandise not using real money, but using the user ID with which the payment was made previously, a convenient service can be realized. In addition, since the payment server 600 of the settlement service company 903 manages the balance relating to the user ID according to the present embodiment, various types of transactions using the user ID, not only the sales of merchandise through the vending machine 100 but also the electronic commerce through the Internet can be realized.

SECOND EMBODIMENT

Figure 9:
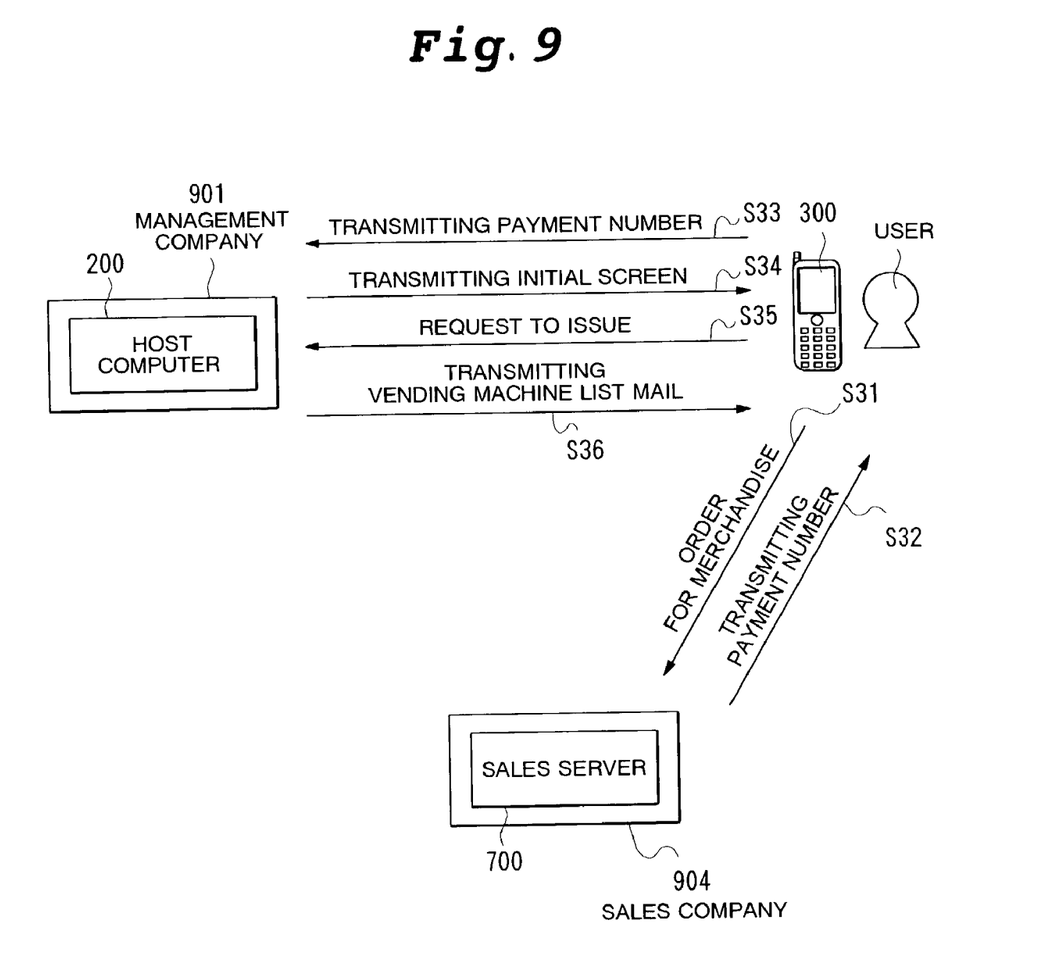
FIG. 9 shows a flowchart of issuing an exclusive ID for a payment in a cash payment system according to a second embodiment of the present invention.
Figure 10:
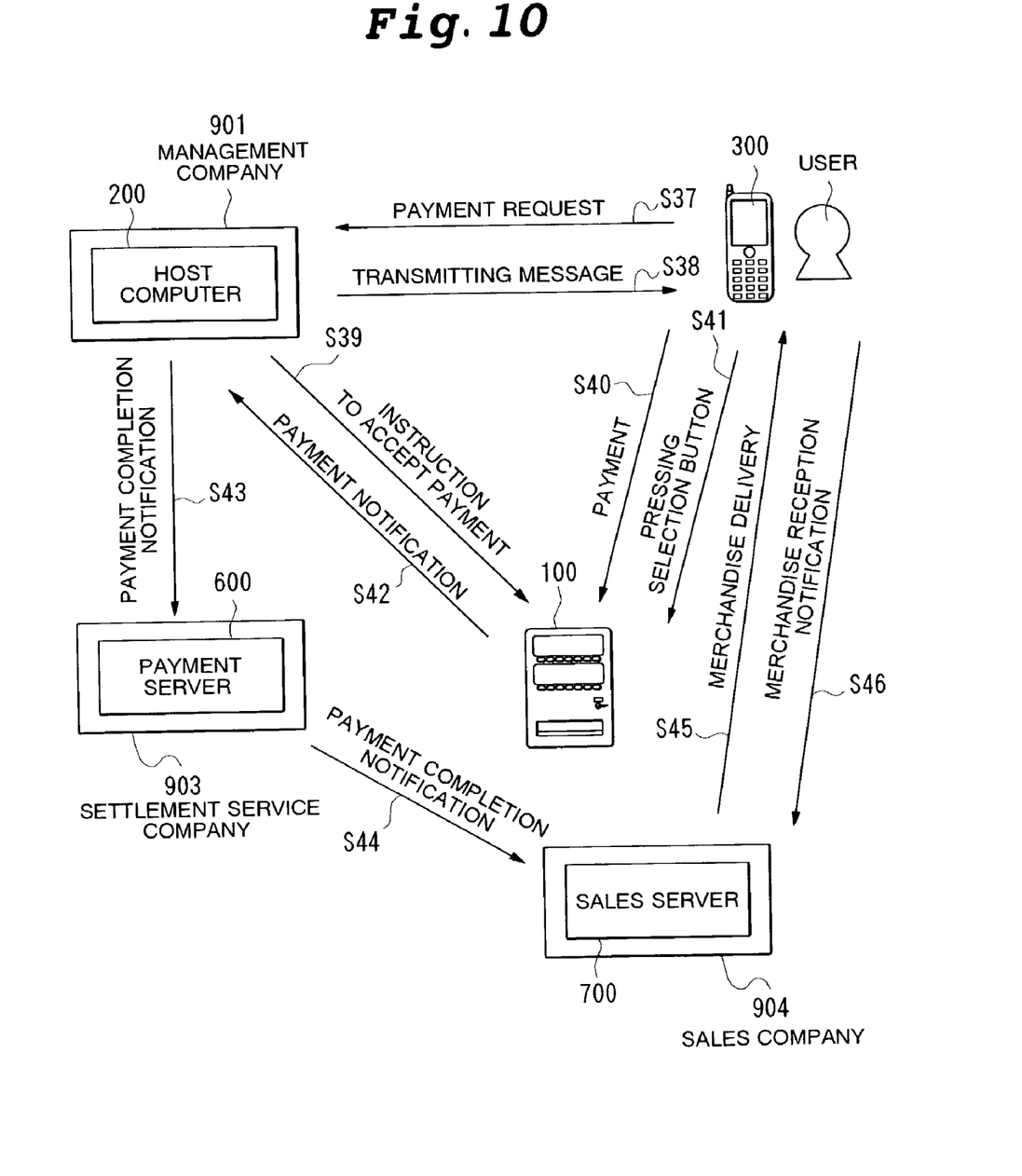
FIG. 10 shows a flowchart of a payment process in the cash payment system according to the second embodiment of the present invention.

A second embodiment of the present invention will be described below by referring to FIGS. 9 and 10. The cash payment system using a vending machine in making a payment in electronic commerce will be described according to the present embodiment. FIG. 9 is a flowchart of issuing an exclusive ID for a payment in a cash payment system. FIG. 10 is a flowchart of a payment process in a cash payment system.

The present embodiment is different from the first embodiment in that various transactions can be conducted using a user ID after a user makes a payment using the user ID according to the first embodiment while according to the present embodiment a payment process is performed by using an ID by issuing the ID each time a payment is made for a transaction. Therefore, according to the present embodiment, the ID is referred to as an exclusive ID for payment. Since the configurations of the vending machine 100, the host computer 200, and the portable communication terminal 300 are the same as those according to the first embodiment, only the differences will be described below.

First, as shown in FIG. 9, the user places an order for merchandise, a service, etc. with a sales server 700 of a sales company 904 by using the portable communication terminal 300 (step S31). The sales server 700 generates a payment number for unique identification of a transaction with the user, and transmits it to the portable communication terminal 300 (step S32). According to the present embodiment, the sales server 700 transmits the payment number to the portable communication terminal 300 as mail. In further detail, the mail includes a link to the host computer 200, and the payment number is embedded into a part of the link.

Next, the user displays the mail received from the sales server 700 on the portable communication terminal 300, and connects it to the host computer 200 by selecting the link included in the mail. At the time of the access, the payment number is transmitted from the portable communication terminal 300 to the host computer 200 (step S33).

The sales-on-payment processor 202 of the host computer 200 transmits a Web page which is displayed as an initial screen in response to the access from the portable communication terminal 300 (step S34). On the Web page, a link is set for each section as on the Web page 500 according to the first embodiment of the present invention. When the user selects the link, the browser turns the mailer 302 active on a new mail generation mode. The mail address set for the above link is specified as the address of the new mail. When the user transmits the mail, the portable communication terminal 300 transmits a request to issue an exclusive ID for payment to the host computer 200 (step S35). At this time, the title and the text of the transmitted mail are not required.

Upon receipt of the issue request mail, the sales-on-payment processor 202 of the host computer 200 generates an exclusive ID for payment in response to the mail, and transmits the mail including a list of the vending machines 100 to the source mail address of the request mail (step S36). The list of the vending machines 100 included in the mail is a list of the vending machines 100 installed in the area selected by the mail address transmitted in step S2. A link is set for each list of the vending machines 100 of the mail. For the link, an exclusive ID for payment and a vending machine ID are set as parameters to the host computer 200 together with the address of the host computer 200. In the steps above, the exclusive ID for payment is issued.

Next, as shown in FIG. 10, the portable communication terminal 300 displays the mail returned from the host computer 200. When the user selects the link of the vending machine 100 through which a payment process is performed according to the mail displayed on the portable communication terminal 300, the browser 303 is activated, and accesses the host computer 200 having the linked-to address. Simultaneously, the exclusive ID for payment and the vending machine ID of the selected vending machine 100 are transmitted to the host computer 200 (step S37).

When the portable communication terminal 300 accesses the sales-on-payment processor 202 of the host computer 200, the sales-on-payment processor 202 generates the identification number for use in a payment process. Then, a Web page including the identification number and prompting the user to make a payment is transmitted to the portable communication terminal 300 (step S38). On the other hand, the sales-on-payment processor 202 issues to the vending machine 100 specified by the vending machine ID received from the portable communication terminal 300 an instruction to enter a payment acceptable mode (step S39). The instruction includes the identification number of the payment process.

Upon receipt of the instruction from the host computer 200, the payment receptor 107 of the vending machine 100 displays the identification number included in the instruction on the display 105. When the user confirms that the identification number displayed on the portable communication terminal 300 matches the identification number displayed on the display 105 of the vending machine 100, the user can avoid mistakenly making a payment for another user. When the user slots coins or bills of a predetermined amount into the vending machine 100 after the user has confirmed the identification number (step S40), the lamp provided for the selection button 104 for payment is blinked. When the user presses the selection button 104 (step S41), the vending machine 100 notifies the host computer 200 of the payment (step S42).

Upon receipt of the payment notification from the vending machine 100, the host computer 200 notifies the payment server 600 of the settlement service company 903 of the payment number, the exclusive ID for payment, and the amount of the payment (step S43). Upon receipt of the notification, the payment server 600 of the settlement service company 903 notifies the sales server 700 of the sales company 904 of the notification (step S44). Since the sales company 904 can recognize the completion of the payment by receiving the notification, it then delivers the merchandise to the user (step S45). Furthermore, as necessary, when the user receives merchandise, the user can send the notification of the reception of the merchandise by mail, through the portable communication terminal 300 (step S46). In this case, the merchandise receipt notification can include a payment number.

As described above in detail, according to the present embodiment, the user can make a payment through the vending machine 100 in a transaction using the sales server 700. In addition, the paid money stored in the vending machine 100 is collected by the vending machine management company 902, and is paid to the sales company 904 through the settlement service company 903.

Described above are the embodiments of the present invention, but the present invention is not limited to these applications. The scope of the present invention is described as the scope of the claims of the invention, and various modifications and changes may be made to those skilled in the art without departing from the true spirit and scope of the invention as defined by the claims thereof.

For example, according to the above mentioned embodiments, the portable communication terminal 300 including the mailer 302 and the browser 303 is used, and the communications of various data between the host computer 200 and the portable communication terminal 300 are established using the applications, but it is obvious that other applications can be used.

Furthermore, for example, according to the first embodiment of the present invention, issuing a user ID and handling the balance for the user ID are managed by different organizations. However, for example, if the management is performed by only one company, then issuing a user ID and handling the balance for the user ID can be managed by the same organization. In this case, it is obvious that these functions can be implemented on one computer, or can be implemented on different computers as in the first embodiment of the present invention.

In addition, according to the above mentioned embodiment, as shown in FIG. 1, the network 401 connecting the vending machine 100 to the host computer 200 is provided separately from the network 402 connecting the host computer 200 to the portable communication terminal 300. However, according to the present invention, any network configuration can be used so far as communications can be established by each device in the network. For example, each device can communicate with others through one network (the Internet, for example).

I claim:

1. A system for performing a payment with a vending machine comprising:
    a portable communication terminal of a user,
    a host computer connected to the vending machine and the portable communication terminal through a network,
    said portable communication terminal having a first transmitter for transmitting identification information of the user and identification information of the vending machine to the host computer;
    said host computer having a second transmitter for transmitting an instruction of the payment to the vending machine specified by the received identification information of the vending machine, the instruction of the payment including a command to enter a cash payment acceptable mode; and
    said vending machine having a controller for entering the cash payment acceptable mode in response to the instruction from the host computer, and said vending machine having a third transmitter for transmitting information of the payment including an amount of the payment to the host computer, and said vending machine having at least one cash identification unit for accepting the payment in cash when in the cash payment acceptable mode.

2. The system according to claim 1, wherein said host computer comprises:
    a generator for generating identification information of user in response to a registry request from the portable communication terminal; and
    a fourth transmitter for transmitting registry information including the generated identification information of user and at least one identification information of the vending machine to the portable communication terminal.

3. The system according to claim 2, wherein said fourth transmitter transmits the registry information by electronic mail.

4. The system according to claim 1, wherein said host computer comprises a fifth transmitter for transmitting a message to the portable communication terminal in response to the information of the user and the vending machine from the portable communication terminal, said message having an instruction prompting the user to make the payment.

5. The system according to claim 4, wherein said fifth transmitter transmits the message on a web page.

6. The system according to claim 4, wherein said host computer comprises generator for generating identification information of payment process in response to the information of the user and the vending machine, said message of the fifth transmitter and said instruction of the second transmitter including identification information of payment process; and
    said vending machine comprises display for displaying the identification information of payment process.

* * * * *